March 13, 1945.   W. L. RAST ET AL   2,371,313
PROCESS FOR MAKING PLASTIC PRODUCTS
Filed April 15, 1941

Inventor
WILLIAM L. RAST
DAVID M. MUSSER
By
Attorney

Patented Mar. 13, 1945

2,371,313

UNITED STATES PATENT OFFICE 2,371,313

PROCESS FOR MAKING PLASTIC PRODUCTS

William L. Rast and David M. Musser, Pittsburgh, Pa., assignors to The Glenn L. Martin Company, Baltimore, Md.

Application April 15, 1941, Serial No. 388,636

3 Claims. (Cl. 92—21)

The invention relates to plastic products and to processes for producing the same.

The primary object of the invention is to produce a plastic material having novel properties, particularly those which adapt the material for structural use.

A further object of the invention is to provide a material having low density or specific gravity while possessing high strength and elasticity. More specifically, the invention contemplates a material having substantial pore spaces therein so as to procure lightness, while retaining desirable structural characteristics therein.

Another object of the invention is to produce a plastic substance in sheet form which is capable of being shaped at low pressures into forms having double curvature. This makes the material especially suitable for the formation of parts of large size, since molds of low strength formed of inexpensive materials may be used; whereas, in the past, the molds of great strength required for high pressure molding have been so expensive that the use of plastic materials for large parts has been uneconomical.

An additional object of the invention is to provide a plastic material of varying density and therefore of varying strength and rigidity in different parts thereof.

Still another object of the invention is to produce molded objects of low specific gravity as compared with the usual plastic articles, and also having very smooth surfaces.

Another object of the invention is to provide a plastic sheet material formed of a number of layers of different density, and particularly such a sheet in which the layers are autogenously bonded together so that they cannot be split apart after molding and curing are finished. More especially the invention contemplates the production of a core or base of low density material substantially uniform throughout faced on one or both sides with a denser, harder surfaced material substantially uniform throughout and having a smooth skin, such a sheet being capable of assuming forms of double curvature under low molding pressures and of forming an autogenous bond between the materials of different densities when so molded.

The invention is particularly applicable to resins, and of these especially to the phenolic condensation products such as the phenol-formaldehyde resins.

The process as described herein utilizes primarily what we have called herein "aqueous" resins, that is, those which are soluble in alkaline aqueous solutions or in water alone, the preferred resins being the so-called "water-soluble" resins which as ordinarily prepared will dissolve in water alone, since these are more active.

A further object of the invention is to produce a material composed of a mass of interfelted fibres, which are preferably unoriented so as to give strength in all directions, distributed through and substantially uniformly surrounded by a solid resin, that is, a resin which is not in fluid state; this material having substantial vacant spaces or pores therein and therefore being of lower specific density than the average of that of the fibres and resin. Such a material may be produced by molding at low pressures, yet will have substantial strength and elasticity.

For this purpose, the uniform distribution of the resin and fibres is important, and the invention therefore provides for the production of such fine distribution, and the further treatment necessary to yield the desired product. More especially, the invention provides for the distribution of the resin and fibres by the formation of a suspension of the fibres in a liquid, and the precipitation of the resin from a solution thereof onto the fibres in this liquid.

While in its final form, an article produced according to the invention will contain resin in a completely polymerized state, the resin in the intermediate product, need not be fully polymerized, especially when a thermosetting resin is used, as long as the resin is adherent to the fibres so as to avoid loss or migration in transportation. However, the resin should be in a solid state in this intermediate product, and the pores giving lightness to the body should be present.

Further objects and advantages of the invention will appear more fully from the following description, particularly when taken in conjunction with the accompanying drawings which form a part thereof.

Figure 1:
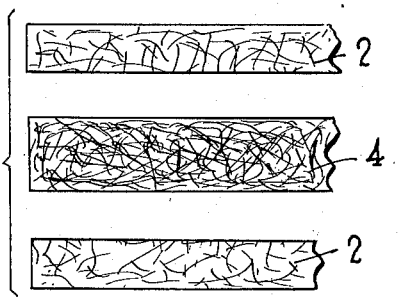
Fig. 1 shows in cross-section, on an enlarged scale, separate sheets of a material according to the invention for use in making a sheet of varying density, as these sheets leave the sheeting machine.

In the normal molding of plastics, the pressures in common use are sufficiently high to compress the plastic until substantially all air spaces therein are eliminated, although in some cases the lumens of fibres may not be resin filled, so that the final product therefore has a density substantially equal to the average density of the solids used. Such pressures range normally from 1000 pounds per square inch upward. The expression "low pressures" when used herein refers to lower pressures than those normally used, that is, pressures such that they leave pores or air spaces in the mass of resin and in the bodies of the fibres.

In carrying out the process, equipment of ordinary, known types is generally applicable.

As fibrous materials, cellulosic fibres are preferred, and especially cotton fibres, in the form of lint or linters, although other fibres of vegetable, animal or mineral origin such as hemp, jute, wool, ramie, asbestos and the like are also useful. Likewise, any suitable synthetic fibre may be used in this process.

One mode of carrying out the invention and producing the desired products will now be described.

The fibres, such as cotton linters, are subjected to a cleaning treatment so as to remove wax and pectinous materials therefrom. This treatment may be of the nature of a mild caustic kier-boil. For example, cotton linters may be boiled in a solution of 1.4% caustic soda for three hours at 16 pounds steam pressure. During the boiling, thorough cleansing is aided by the addition of a small amount of a wetting agent, such as "Tergitol 7." "Tergitol" is a registered trademark for a group of higher sodium alkyl sulfates which are powerful wetting and penetrating agents. "Tergitol 7" is understood to be an aqueous solution of the sodium sulfate derivative of 3,9-diethyltridecanol-6. The wetting agent chosen must be one which does not attack the cellulose fibres. After this treatment, the fibres are immediately washed free of all caustic, so as to prevent discoloration and tendering.

Instead of a kier-boil, extraction of wax and resinous materials with volatile solvents such as benzol or petroleum solvents may be used.

The cleaned fibres are then beaten with water to form a suspension of the fibres in the manner usual in paper making. The procedure is controlled in the known manner to produce the desired fibrillation and hydration, as well as a reducton to a suitable average fibre length. To reduce the time of mechanical beating required, an agent which accelerates the beating action may be used, such as methyl cellulose, as described in the application of David M. Musser and Harry C. Engel, S. N. 368,730, filed December 5, 1940. By the reduction in beating time, the strength of the fibre is preserved. During the beating, periodic drainage tests are made in a standard Tappi pulp-testing apparatus, until the pulp shows a proper degree of hydration. This condition is indicated by an increase of from two to five seconds in the time of drainage as measured in the apparatus, following upon a considerable period during which the drainage rate has been constant. The beating is then stopped, and the fibrous suspension is preferably removed to another vessel.

A water-soluble resin in aqueous solution is now added to the pulp suspension and thoroughly mixed therewith, the proportion of resin to fibre in the mixture being equal to or somewhat greater than that desired in the final product.

A precipitating agent, preferably a material which reduces the pH, is then added in the form of a dilute solution. Addition is continued gradually until the resin is substantially completely precipitated. An excess of the neutralizing agent is used to ensure substantially complete precipitation. The completion can usually be determined in the case of phenolic resins by changes in color, since the normal phenolic resin is colored. During the addition of the precipitating agent, agitation of the mass is continued. The resin is thus precipitated on the fibres and adheres thereto during further treatment.

The suspension is now fed to a sheeting machine of any type used for the preparation of felted pulps, and the greatest part of the water is removed by suction. Or, in some other suitable manner, the water is drained off until a pulpy but wet mass, substantially capable of holding its own shape, is produced.

In the preparation of a three-ply sheet, which represents the preferred form of the invention, two pulp-resin masses containing different proportions of fibres are formed. For the outer sheets, the proportion of fibres to resin is less than for the core sheet. These surface and core sheets are represented at 2 and 4 respectively in Fig. 1.

Figure 2:
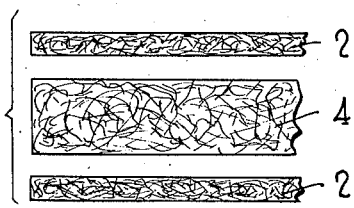
Fig. 2 shows the same sheets after pressing.

The surface sheets 2 are now placed in a press, or in some other manner are subjected to a pressure of around 700 to 900 pounds per square inch. This expresses most, but not all, of the water within the sheets, and reduces them in thickness to the form shown in Fig. 2. This pressure, however, is not sufficient to remove all air spaces. The core sheets 4 may be subjected to a slight pressure to squeeze some of the water therefrom, if they are too wet. The surface sheets are then arranged above and below the core sheet, best results being obtained if the sheets are superposed on each other while they are still somewhat wet. The composite sheet is then preferably compressed for approximately six hours at a pressure of around 20 pounds per square inch. The sheet is then dried preferably by circulated air at a temperature of 95° F. to 115° F. until the moisture content of the sheet is reduced to approximately 5% to 15% of the dry mass. The air is fed uniformly over all exposed surfaces of the sheet, so that uniform drying is obtained, thus substantially preventing warping, separation of the sheets and curing or aging of the resin.

The resulting sheet may be stored, handled or shipped without losing its resin content, and without causing any substantial migration of the resin within the sheet.

Such sheets may be formed into almost any desired shape, including shapes of double curvature, by placing them between mold parts heated to temperatures suitable for softening and curing the resin, for example around 280° F.-300° F. The heat softens the plastic so as to permit the individual particles thereof to fuse together, and, in the case of thermosetting plastics, also cures or completes the polymerization thereof. A pressure of from 5 to 200 pounds per square inch is sufficient to shape the material, but is insufficient to destroy the pores therein. After heating in the mold for 25 to 35 minutes, the resin is cured and the article is completed.

Figure 3:
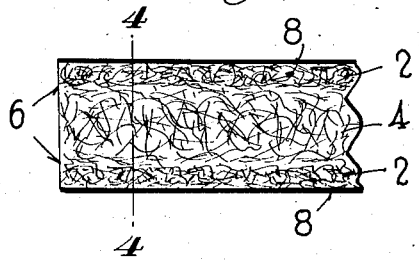
Fig. 3 shows the final material formed from these sheets after molding.
Figure 4:
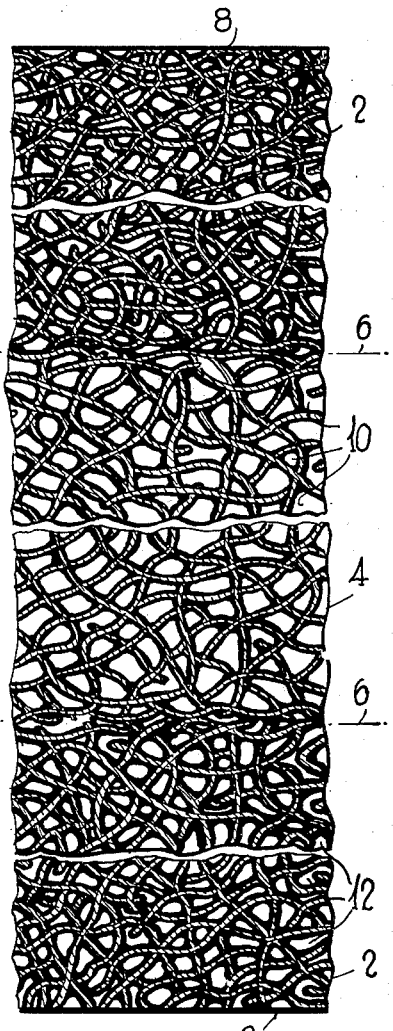
Fig. 4 is a further enlarged view on the line 4—4 of Fig. 3.

Such an article has a cross-sectional structure of the type shown in Figs. 3 and 4. The outer or surface layers 2 are intimately joined in the areas 6 to the central or core layer 4, so as to be autogenously bonded thereto. At the same time the outer faces 8 of the surface layers 2 are hard and very smooth. Therefore, the product has a core of low density with large and numerous pores 10 therein, and thinner, denser surface layers having smaller and less numerous pores 12. The whole sheet has high strength in proportion to its specific gravity. It is marked by substantial elasticity. Finally, the smooth, hard surfaces resist abrasion or rupture.

The following example represents a specific manner of practicing the invention, but of course is not intended to limit the same in any manner.

EXAMPLE

Preliminary processing of fibres

A quantity of 62 parts by weight on the dry basis, or of approximately 67 parts on the air-dry basis, of mill-run cotton linters is suspended in 400 parts of caustic soda solution of concentration 1.4 per cent and this suspension is autoclaved at 16 pounds steam pressure for three hours. A small amount of a wetting agent, such as the commercial product "Tergitol 7," is used during this treatment. Since a clean fibre is desired following the kier-boil, the mass is washed well at once, so as to prevent the precipitation of the color onto the fibres; and the fibres are washed free of all alkali. Because of the removal of wax, fatty acids, etc., the 62 parts of dry unconditioned linters are reduced during the kier-boil to approximately 57 parts of dry conditioned linters.

The 57 parts of conditioned linters calculated on the dry basis are next subjected to a controlled beating process, so as to produce fibrillation and hydration, as well as a reduction to a suitable average fibre length. This operation is accomplished by suspending the conditioned linters in 3243 parts of water in a beater of the type ordinarily used in paper-making operations. A beating accelerating agent is added to reduce the time of beating and preserve the strength of the fibre. The progressive condition of the pulp during beating is determined by successive drainage measurements, using a Tappi pulp-testing apparatus. The time of drainage will remain constant at 5 seconds for the first part of the beating and will then increase very rapidly as the pulp tends to show the proper degree of hydration. Beating is continued until a good pulp condition, indicated by an increase of 3 seconds in the time of drainage over the constant rate period, is obtained.

Preparation of wet core and wet surface sheets

The total of 3300 parts of pulp-fibre suspension is subdivided into two batches as follows: a first batch consisting of 1500 parts by weight of the pulp suspension (in other words, a quantity of pulp suspension containing 26 parts of cellulosic fibre on the dry basis) for use in the preparation of a single core sheet, and a second batch consisting of 1800 parts of the pulp suspension (in other words, a quantity of pulp suspension containing 31 parts of cellulosic fibre on the dry basis) for use in the preparation of two identical surface sheets. To the first batch of pulp suspension is added 100 parts of Bakelite XC-13268 (an aqueous solution of a thermosetting resin) liquid, water-soluble, phenolic resin of solids content 40 per cent, and of viscosity approximately 0.033 poise in 3 parts of ethyl alcohol at 25° C., and of pH approximately 10.0, dissolved in 500 parts of water. To the second batch of pulp suspension is added 224 parts of the same XC-13268 resin dissolved in 1120 parts of water. Each batch of resin solution is mixed with the batch of pulp, and mechanically stirred at a fairly rapid rate to insure uniform dispersion of the resin throughout the pulp suspension. The resin is precipitated from solution by slowly pouring into the fairly rapidly stirred mixture of resin and pulp, a sufficient quantity of aqueous solution of ammonium carbonate of concentration 10 per cent. The quantity of ammonium carbonate solution is slightly in excess of that necessary for complete precipitation, that is, ammonium carbonate solution is added to the agitated batch of resin until the batch, which is of pinkish or reddish color, changes in color and the solution is substantially clear.

The first batch of pulp suspension and precipitated resin is sheeted in proper thickness under controlled conditions by suitable equipment, to yield a single wet core sheet. For example, a rotary type screen machine, such as is employed in the pulp industry in making of wet laps, may be used. The second batch of pulp suspension and precipitated resin is divided into two equal parts and these are sheeted in like manner to yield two similar wet surface sheets. The surface sheets are compressed under a pressure of 800 pounds per square inch, producing comparatively thin resinous sheets. The two wet compressed surface sheets and the wet core are assembled and compressed by approximately 20 pounds per square inch pressure for approximately six hours to yield a three-ply sheet about 0.5 in. thick. The moisture content of this three-ply assembly is approximately 400% to 500%, based on the combined dry weight of fibre and resin.

Drying and molding of composite sheets

The three-ply sheet is then dried in a stream of air at a temperature of approximately 100° F. until the moisture content is reduced to 12 percent as based on the dry weight. In the drying, a rapid removal of moisture should be achieved in a uniform air flow so as to prevent delamination or warping.

The dry three-ply sheets are molded by subjecting them to a pressure of 25 pounds per square inch and a temperature of 280° F. for a time of 35 minutes, in heated doubly curved dies, and will readily assume the shape of the dies. Any suitable mold lubricant for phenolic plastics, such as wax emulsion, may be used to prevent the molded sheets from sticking to the die.

It will be obvious that, within the scope of the invention, many variations are possible in the materials used and the conditions of carrying out the process.

While water is the preferred solvent for the resin, it is evident that other solvents in which the resin could be dissolved and from which it could be precipitated onto the fibre might be used.

The suspension of fibres in water should be generally the same as in paper manufacture. For example, the fibres may make up from 1% to 3%, and usually around 1.7% of the suspension. The resin is added to the pulp in a suitable concentration, for example in the form of a 5% to 20% solution.

The temperature of the water is not of substantial importance, but preferably should be kept low enough to prevent substantial aging of the resin during the formation of the sheets.

It is preferred to work at temperatures of 75° to 85° F.

As a precipitating agent, a substance which does not have any substantial aging effect on the resin, and which is substantially inert to the fibres and to the resin, is desired. The most satisfactory agents for this purpose are soluble salts of weak acids such as ammonium carbonate, ammonium acetate and the like. It is especially advantageous to use those compounds which, like ammonium carbonate, are decomposed by the heat of molding, that is, at temperatures below 300° F., into volatile constituents which will be driven out of the mass. It is best to add this material in a dilute solution, for example a 10% solution.

The proportion of resin to fibres may also be varied widely, as long as the resin is sufficient for substantially surrounding the fibres, and enough fibres are present to give the necessary strength to the product. In a material having portions of differing density, the resin should be in higher proportion in the denser layers. For example, in the case of a three-ply structure of the type described, the proportions by weight of resin to fibres would be around 1½ to 1 in the core, and about 3 to 1 in the surface layers.

Various other methods of drying may be used, as for example steam drying, vacuum drying and hot press drying.

The material in its preferred form has a specific gravity of from three-tenths to eight-tenths of the average specific gravity of the fibres and resin, so that the specific gravity of the product will usually vary between 0.4 and 1.2. In the three-ply material, the average specific gravity preferably lies around 0.5 to 0.7, or about one-half or less of that of the fibres and resin.

The moulding is carried out at a low pressure, preferably between 5 and 300 pounds per square inch, and best results are usually obtained between 10 and 40 pounds per square inch.

The term "solidified" as used in the claims designates a material which has been converted into a non-fluid integral mass either by full polymerization (or curing) under the influence of heat in the case of thermosetting resins; or in some other manner, as by cooling in the case of thermoplastic resins.

The term "solid" as used in the specification and claims designates a material, whether polymerized or not, which is incapable of flow at normal atmospheric temperatures, but may be finely or evenly distributed or in powder or other finely subdivided form.

While we have described herein some embodiments of our invention, we wish it to be understood that we do not intend to limit ourselves thereby except within the scope of the appended claims.

We claim:

1. A process of producing a plastic article which comprises forming a suspension of fibres in a liquid, substantially uniformly distributing a resin through the suspension in such a way that the resin adheres to the fibres in solid form, forming porous sheets from the resin and fibres while removing most of the liquid therefrom, compressing two of the sheets to a substantially greater degree than a third sheet, arranging said first two sheets on opposite sides of said third sheet while moist, and molding the resulting material under heat at about 280° to 300° F. and at a low pressure, of about 10 to 40 lbs. per sq. inch.

2. In the production of plastic articles from fibres and a resin, the steps of forming a suspension of the fibres in water, adding to the suspension an aqueous solution of a water-soluble resin, then adding a salt of a weak acid which is substantially inert to the fibres and resin and which reduces the pH to cause precipitation of the resin, whereby the resin adheres in solid form to the fibres, forming porous sheets from the resin and fibres while removing most of the liquid therefrom, compressing two of the sheets to a substantially greater degree than a third sheet, arranging said first two sheets on opposite sides of said third sheet while moist, drying the sheets, and molding the resulting material under about 280° F. to 300° F. heat, and at a pressure below 300 pounds per square inch.

3. In the production of plastic articles from fibres and resin, the steps of forming a suspension of the fibres in water, adding to the suspension an aqueous solution of a water-soluble, thermo-setting, phenolic resin, by adding a salt of a weak acid which is substantially inert to the fibres and resin, and which reduce the pH to cause precipitation of the resin, whereby the resin adheres in solid form to the fibres, forming porous sheets from the resin and fibres while removing most of the liquid therefrom, compressing two of the sheets to a substantially greater degree than a third sheet, arranging said first two sheets on opposite sides of said third sheet while moist, drying the sheets, and molding the resulting material under a heat surface to set the resin, and at a pressure of about 10 to 40 pounds per square inch.

WILLIAM L. RAST.
DAVID M. MUSSER.